United States Patent [19]

Bratt

[11] Patent Number: 4,814,086

[45] Date of Patent: Mar. 21, 1989

[54] METHOD AND APPARATUS FOR FLUID TREATMENT BY REVERSE OSMOSIS

[76] Inventor: Russell I. Bratt, 2431 Laguna Dr., Ft. Lauderdale, Fla. 33316

[21] Appl. No.: 98,747

[22] Filed: Sep. 16, 1987

Related U.S. Application Data

[63] Continuation of Ser. No. 783,788, Oct. 3, 1985, abandoned.

[51] Int. Cl.$^4$ .............................................. B01D 13/00
[52] U.S. Cl. .................................... 210/636; 210/652; 210/195.2
[58] Field of Search ............ 210/636, 639, 652, 195.2, 210/130

[56] References Cited

U.S. PATENT DOCUMENTS

| | | | |
|---|---|---|---|
| 4,014,787 | 3/1977 | Shorr | 210/639 |
| 4,243,523 | 1/1981 | Pelmulder | 210/652 |
| 4,411,781 | 10/1983 | Schnabel et al. | 210/195.2 |
| 4,579,662 | 4/1986 | Jonsson | 210/636 |

FOREIGN PATENT DOCUMENTS 2601859 7/1976 Fed. Rep. of Germany ...... 210/636

Primary Examiner—Frank Spear
Attorney, Agent, or Firm—Bayard H. Michael

[57] ABSTRACT

Either of the two relatively large capacity tanks can be connected in a high pressure loop or system including a reverse osmosis membrane vessel and a circulating pump. When the pressure is high enough in this loop, product is drawn from the vessel. A feed pump supplies fluid to the tank not in the high pressure system for flushing that tank. The feed pump also supplies fluid to the input of a high pressure pump which provides make-up fluid to the high pressure system at a pressure sufficient to sustain reverse osmosis. The tanks are interchanged periodically. This system only has to provide high pressure fluid at a rate equivalent to the rate of withdrawal of product from the system.

14 Claims, 1 Drawing Sheet

METHOD AND APPARATUS FOR FLUID TREATMENT BY REVERSE OSMOSIS

This is a continuation of Ser. No. 783,788 filed on Oct. 3, 1985, now abandoned.

BACKGROUND OF THE INVENTION

This invention relates to treatment of water by reverse osmosis. Osmosis is the natural tendency for a dilute liquid to pass through a semipermeable membrane to a more concentrated liquid. Reverse osmosis requires high pressure on the sea water, for example, so that clear water will pass through the semi-permeable membrane and be recovered while leaving the salt ions and other impurities behind. Reverse osmosis is used to treat salt water and brackish water to deliver a product relatively free of salt and other contaminants. The process is used to treat potable water to deliver a product which has greater purity...in some cases the process is applied in series to end up with very pure or laboratory quality water. Impurities are removed on each pass through the membrane. The process is used on gases. Ships and boats use the process to produce potable water and reduce the amount which has to be stored in tanks. Many shore installations are required because the wells are brackish or sea water has to be treated.

In view of differing types of fluids (i.e., liquid or gas) which are treated by reverse osmosis, the input will be referred to as "untreated fluid" (which contains impurities) and the useable output (clear water, etc.) is referred to as "product" [which impurities (not all impurities, however) have been removed] while the fluid which is returned to the source is referred to as "waste" or "waste fluid". If more impurities are to be removed, the "product" is passed through another reverse osmosis treatment.

A conventional reverse osmosis system draws in untreated fluid, passes it through a filter(s) and then a high pressure pump injects the fluid into the reverse osmosis vessel where the product passes through the membranes for recovery while the waste fluid is returned to the source. The high pressure pump maintains the pressure at 800 psi when treating salt water. The waste coming out of the reverse osmosis vessel is close to atmospheric pressure. Typically, the product recovery is 10% of the sea water pumped. Thus, for every 100 gallons of product, the high pressure pump must handle 1,000 gallons of sea water at 800 psi. High pressure and high volume translates to high cost.

Reverse osmosis systems are typically used in areas where the cost of electric power is very high or must be generated. On a boat the cost of a generator is appreciable and space is at a premium.

SUMMARY OF THE INVENTION

This invention relates both to a method and apparatus for treating fluid by reverse osmosis.

The invention contemplates the method for treating water by reverse osmosis by filling a treatment system including a tank and a reverse osmosis membrane vessel with untreated fluid which is then continuously circulated through the system while product is extracted from the vessel and untreated make-up fluid is provided to the system at a pressure high enough to maintain reverse osmosis and at a rate equivalent to the rate of product extraction.

The method further contemplates sequential batching. To this end the system contemplates use of two fluid supply tanks either one of which can be connected in the circulating system with the reverse osmosis membrane vessel. The tank not in the system at the time is drained and filled with untreated fluid or is flushed with untreated fluid so that when the tanks are interchanged in the system the system is starting out with essentially untreated fluid at the source conditions and the tank taken out of the system has, at the instant it is removed, fluid of increased impurity due to the fact that product has been taken from it.

It may be noted that salt water typically has 36,000 PPM (parts per million) of total dissolved solids (TDS). When a batch is being treated the TDS increases and when the tank is drained and refilled or is flushed (both being sometimes referred to as "flushed" hereafter) the resulting TDS in the tank will be somewhat greater than 36,000 PPM....and will be closer to 36,000 PPM the more frequently the tanks are flushed.

The interchange between the tanks takes a very short time and production by this method is almost uniform; but the amount of fluid which has to be pumped at high pressure is a small percentage of the fluid under treatment. Indeed, this permits a considerable reduction in capacity and power requirements for pumps and the like. The operating costs are reduced dramatically.

The apparatus for accomplishing this invention in its simplest form contemplates a circulating pump and a reverse osmosis membrane vessel having a product outlet. Means are provided for maintaining the system at the pressure required to obtain reverse osmosis and means are provided for supplying fluid to be treated to the system at the same rate as the rate of product extraction from the system. The invention further contemplates that the last two means constitute a high pressure pump delivering the untreated fluid to the system. Thus, this pump steps up the pressure to the reverse osmosis pressure (typically 800 psi) and the rate is controlled to make up for the product drawn out of the system.

The apparatus further contemplates that the foregoing simple system includes a water tank which functions to increase the capacity of the batch treatment.

A further refinement of the invention is the provision of a second water tank which is, in effect, in reserve while the first tank is in the high pressure system. After a prescribed period of time or after the salinity of the water in the system reaches a trigger level, the first tank is removed from the high pressure system and the second tank is substituted. The batch treatment is then resumed with the second tank in the system while the first tank is flushed (or drained and filled) with impure source water to reduce the salinity in the tank and ready it for return to the system when the second tank is taken out of the system.

The two tanks in the treatment system are alternated and the production is virtually continuous. The high pressure pump capacity is greatly reduced. The cost of the initial equipment is greatly reduced. The energy costs are dramatically reduced. The net result is that water treatment plants utilizing reverse osmosis become economically practical and feasible for many situations where they were heretofore ruled out. Furthermore, the cost of clear water to the substantial portion of the world population which must rely on desalination is greatly reduced. The economic and political impact on the world is substantial.

DETAILED DESCRIPTION OF THE DRAWINGS

Figure 1:
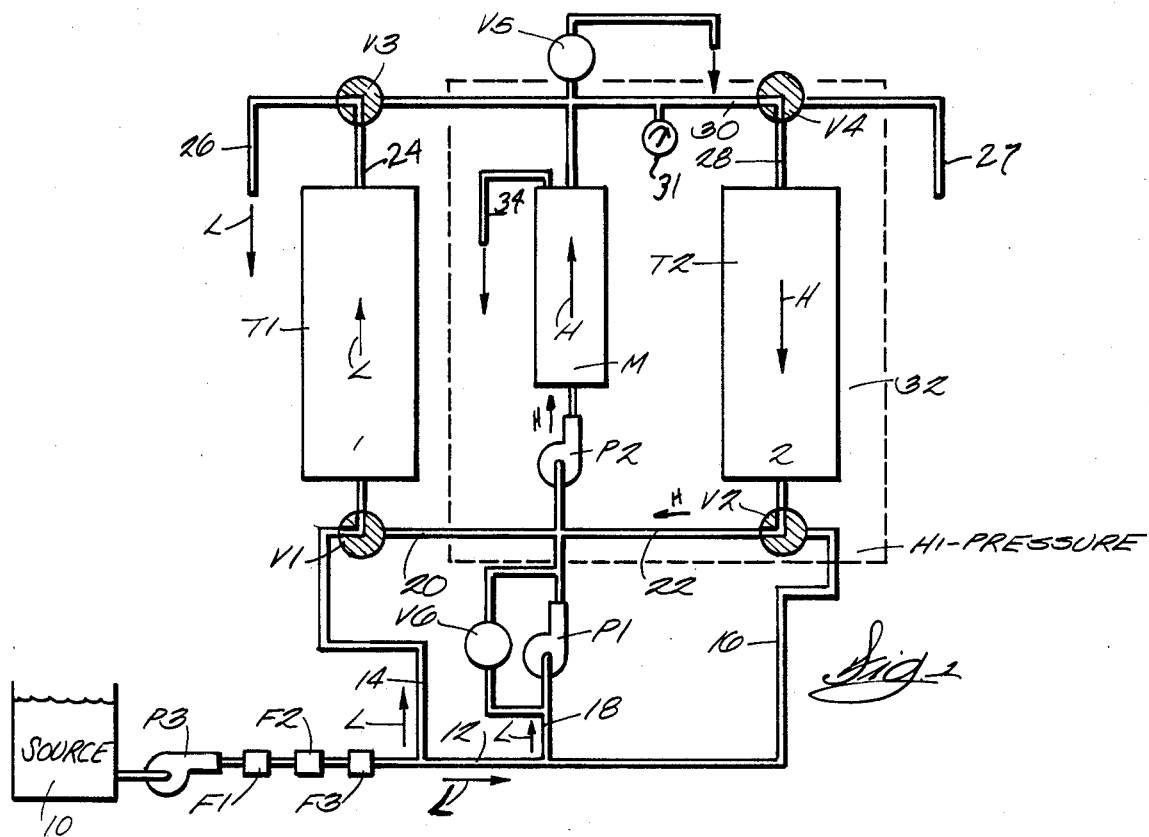
FIGS. 1 and 2 are schematic representations of the system and show the two principal phases of operation of the equipment.

The system shown in FIG. 1 draws from source 10 fluid which will sometimes be referred to as impure water or sea water since very often reverse osmosis systems are used to provide potable drinking water from sea water. The feed pump P3 supplies the sea water through various filters F1, F2, F3 to conduit 12 which has one branch 14 connected to tank T1 via three-way valve V1 and the conduit 12 has another branch 16 connected to tank T2 via valve V2 while the main and third branch 18 is connected to high pressure pump P1. The output of the high pressure pump P1 is connected to the inlet to circulating pump P2 and the output of P2 is connected to the reverse osmosis membrane vessel M. It will be noted that the output of pump P1 is also connected to the valves V1 and V2 via conduits 20, 22 respectively.

In FIG. 1, valve V1 is positioned as shown so that the feed pump P3 supplies low pressure sea water to the tank T1 and the outlet 24 of tank T1 leads to three-way valve V3 which is positioned as shown to discharge the sea water through conduit 26. Normally the sea water would be returned to the sea. Valve V2 is positioned to connect the tank T2 to conduit 22 on the outlet side of pump P1. The other end of tank T2 is provided with a conduit 28 connected to three-way valve V4 which is positioned to connect tank T2 to the sea water outlet of the membrane vessel M through the cross conduit 30.

The circulating pump P2 will circulate the water in the tank T2 and the membrane vessel M and, of course, the associated conduits. The circulating pump is capable of handling the 800 psi system pressure. The actual pump head differential is relatively low...under 50 psi. The capacity is determined by the membrane flow requirements. The high pressure system is enclosed in the dashed line 32 in FIG. 1. The high pressure comes from the high pressure pump P1 which replenishes the system to make up for the product drawn off through the product outlet 34 leading from the vessel M. The high pressure pump provides approximately 800 psi for most sea water contitions. Different systems may require pressures ranging between 200 and 1,000 psi depending on the PPM of TDS. The valve V6 connecting the outlet of pump P1 with the inlet of pump P1 is a pressure relief valve. Thus, if the pump is putting out more water than is being expelled from the closed system (T2+M and piping) the pressure would tend to go much higher. Therefore, the valve V6 opens (manually or automatically) to relieve the pressure in the system. So long as the pump P1 is making up the volumn drawn out from the system, the pressure will be maintained at the required high pressure. A pressure gage 31 is provided in conduit 30 which is always at high reverse osmosis pressure.

It will be noted that the system just described is operating, in effect, as a closed system or a batch system. The high pressure pump P1, which is the pump which uses a lot of power since it has to produce such high pressures, is only pumping the amount of water as is withdrawn from the clear water outlet 34 from the reverse osmosis membrane vessel M. This is approximately 1/10 of the amount of high pressure water the conventional 10% recovery reverse osmosis system has to handle. Therefore, the high pressure pump can have a capacity in the neighborhood of 1/10 of that in the conventional system. It should be understood that some operating conditions and requirements may increase the size of the high pressure pump P1, but, in any event, the size of the pump and, therefore, the power requirement is considerably reduced over the usual system.

Obviously, this system will tend to build up the salinity in the closed system or batch. Therefore, after some period of time, determined by tolerance to increase salinity and the volume of the system and the capacity of the membrane, it is desirable to dump the contents of the system. The present arrangement is, in effect, a batch system arranged to operate in sequence. Thus, after the salinity build-up or after a prescribed time period has elapsed, the control (not shown) could either shut down high pressure pump P1 or open relief valve V5 to drop the system pressure and reduce the pressure differential across the three-way valves V1, V2, V3, V4. Now these valves can be turned with very little power requirement. They are turned to the positions shown in FIG. 2.

Figure 2:
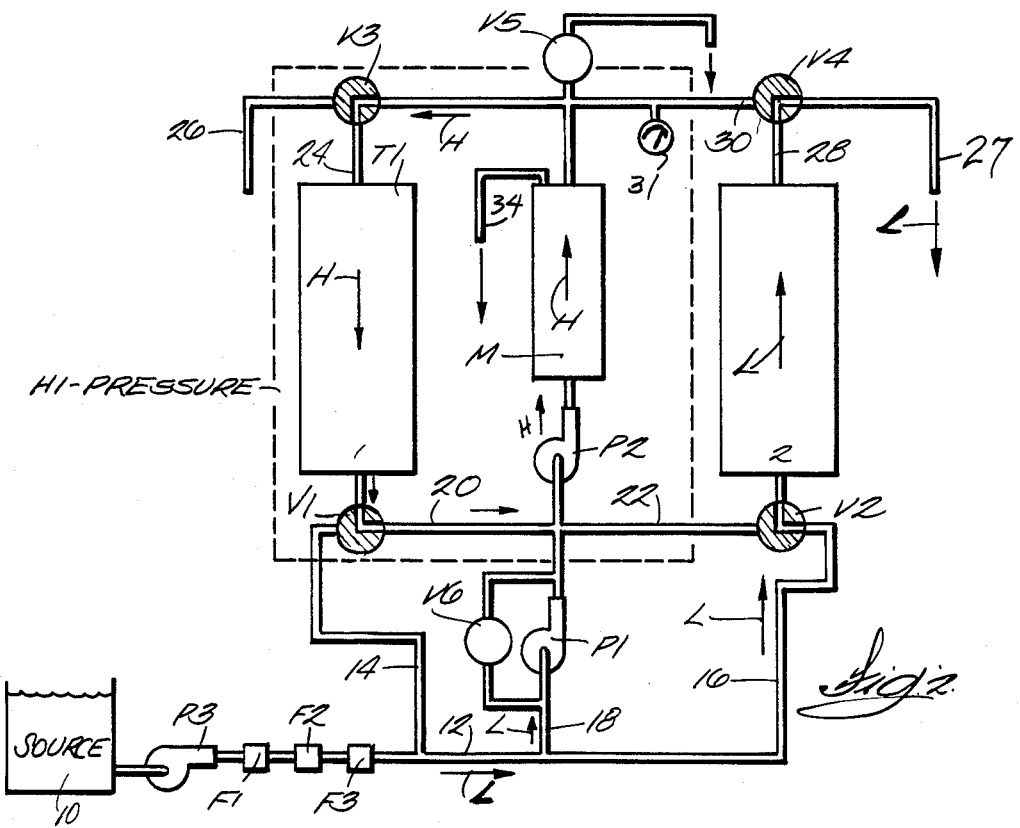

In FIG. 2, tank T2 is out of the high pressure loop and tank T1 is in the high pressure system. The circulation through the membrane vessel M is still in the same direction. Tank T1 has previously been filled with fresh sea water from the feed pump P3 through the filters F1, F2, F3 and valve V1. Therefore, the system is starting operation with standard sea water salinity. In the meantime, tank T2, which previously was in the system, is connected via valve V4 and conduit 27 to exhaust to the sea and the feed pump now supplies low pressure sea water to the tank T2 to flush the tank. The flushing will continue and the tank will contain sea water close to source salinity. A more complex valving could first dump T2 to the sea and then fill T2 from the feed pump. Both are sometimes referred to as flushing the tank. Dumping and filling will likely result in lower starting salinity.

After the salinity, as determined by prior testing by time or by meters testing product salinity or by testing the salinity of the circulating fluid, reaches a control trigger level, or after a fixed time lapse or reaching some other operating trigger, the system will again reverse tanks so that tank T1 will now be dumped and tank T2 will be back in the high pressure loop.

In the normal system, the amount of water in tanks T1 and T2 is far greater than the amount of water in the membrane vessel M and the system piping. Therefore, transferring from tank to tank is highly effective by way of having each batch start with close to prevailing sea water salinity.

In use the system would have some additional connections to permit flushing (cleaning) the system and for reduction in the salt build-up on the membrane. This type of plumbing for maintenance purposes is well understood.

It will be appreciated that various control systems can be provided and various sequencing of valves can be incorporated. Furthermore, the use of pressure balanced spindle or spool valves may make it feasible to transfer over from tank to tank without requiring shut down of the high pressure pump P1. The three-way valves can be replaced by standard valves and check valves as appropriate. The rotary three-way valves are used to simplify the disclosure. The specific valving is immaterial to the invention.

Since water treatment by reverse osmosis has such great and significant use in providing potable water from sea water or brackish water, it is appropriate to review the system in that light. Usually the yield is about 10% which in the past meant 1000 gallons had to be pumped at 800 psi to yield 100 gallons of potable water (product). With the present system, only 100 gals. have to be pumped at 800 psi to yield 100 gals. of potable water. Present thinking indicates it will likely be more efficient to dump (drain) the tank (T1 or T2) taken from the system and then refill it with sea (or brackish) water to minimize system salinity as opposed to flushing the tank. The required capacity for the high pressure pump P1 is so low for many systems (yachts, etc.) that the by-pass V6 to the inlet becomes an expedient alternative. It is difficult to purchase high pressure pumps in such low capacity ranges. The various considerations in different specific uses (boat, ship, land based) and power availability will dictate different details in the system. Those details are unimportant in the overall and the invention is defined in the claims.

I claim:

1. The method of treating by reverse osmosis untreated fluid to produce a product from which impurities have been removed, comprising the steps of,
   filling a closed loop treatment system including a tank and a reverse osmosis membrane vessel with untreated fluid containing impurities,
   continuously circulating the untreated fluid through said system at a pressure high enough to achieve reverse osmosis,
   continuously extracting from said system fluid product from which impurities have been removed, such product being the only fluid withdrawn from said system during such circulation in the system,
   means for periodically removing said tank from said closed loop system to flush the tank and refill it with untreated fluid,
   and continuously providing untreated make-up fluid to the system at high pressure to maintain the pressure in the system at the pressure necessary to achieve reverse osmosis.

2. The method of claim 1 including the steps of,
   flushing and filling a second tank while the first tank is connected in said system,
   then connecting the second tank in the system and disconnecting the first tank from the system and flushing the first tank with untreated fluid.

3. Reverse osmosis apparatus comprising,
   a reverse osmosis membrane vessel and a circulating pump and a tank plumbed to make a closed loop system,
   said reverse osmosis membrane vessel having a product outlet for continuous removal of treated fluid from which impurities have been removed, such treated fluid being the only fluid withdrawn from said system during such circulation in the system,
   means for filling said system with untreated fluid,
   and a circulating pump continuously circulating said fluid through said system,
   means maintaining the pressure in said system high enough to produce reverse osmosis so product is expelled from said outlet,
   said pressure maintaining means including a high pressure pump continuously providing untreated fluid to the system at high pressure at the same rate as the rate at which product is taken from said outlet
   and means for periodically removing said tank from said closed loop system to flush the tank and refill it with untreated fluid.

4. Apparatus according to claim 3 including a second tank,
   valve means for substituting said second tank in said system for the first named tank,
   said valve means being operable to return said first tank to said system and to remove said second tank from said system.

5. Fluid treatment apparatus comprising,
   a closed loop untreated fluid system including a reverse osmosis membrane vessel, a tank and a circulating pump,
   said reverse osmosis membrane vessel having a product outlet for continuous removal of treated fluid from which impurities have been removed, such treated fluid being the only fluid withdrawn from said system during such circulation in the system,
   said system being filled with untreated impurity containing fluid at a pressure high enough to achieve reverse osmosis,
   said circulating pump continuously circulating said untreated fluid through said closed loop system,
   and means for continuously replenishing the product removed via said outlet with untreated fluid at pressure high enough to achieve reverse osmosis.

6. Fluid treatment apparatus according to claim 5 in which said replenishing means comprises a second pump and includes,
   a pressure relief valve for relieving pressure on the outlet of said second pump to the inlet side of said second pump.

7. Fluid treatment apparatus according to claim 6 including a second tank,
   means for alternately connecting the first named tank and said second tank in said closed system,
   and means for flushing the tank not then in said system with untreated fluid whereby the flushed tank can be substituted in said system to assure the efficacy thereof.

8. Fluid treatment apparatus comprising,
   a circulating closed loop system including a tank, a reverse osmosis membrane vessel having a product outlet, and a circulating pump,
   means for filling said system with untreated fluid and continuously circulating the fluid through the closed loop system,
   means continuously supplying said system with untreated fluid at a pressure high enough to achieve reverse osmosis and at a rate equal to the rate at which product is continuously drawn from said outlet, the product withdrawn from said outlet being the only fluid withdrawn from the system during such continuous circulation in this system,
   said system being operative to remove impurities from the untreated fluid,
   and means for flushing said tank at intervals to prevent excessive build-up of impurities in the system;

9. A fluid treatment system including,
   a reverse osmosis membrane vessel including an untreated fluid inlet, an outlet and a product outlet,
   a circulating pump
   a fluid tank connected to said pump and said vessel to form a closed loop system so the pump can continuously circulate fluid through the tank and vessel, means for filling said tank from an untreated fluid source, valve means for closing off said tank from said source, a high pressure pump connected to said source and said tank and vessel to continuously provide untreated fluid threto at the rate at which product is continuously discharged from said product outlet, said product having impurities removed therefrom.

10. Fluid treatment apparatus comprising, a closed loop batch treatment system including a circulating pump and a reverse osmosis membrane vessel having a product outlet and further including a tank which adds to the capacity of the system, a high pressure pump adapted to be connected to an untreated fluid source and connected to said systemto continuously deliver fluid to the system at a pressure high enought to sustain reverse osmosis and at a rate equal to the rate at which product continuously is withdrawn from said outlet, said circulating pump being operative to continuously circulate fluid through said closed loop system, said product comprising treated fluid from which impurities have been removed, the impurity of the fluid in said system increasing as product is drawn from said outlet, the apparatus including flushing means to periodically flush said tank with untreated fluid from the source to reduce the impurity of the fluid in the system.

11. Fluid treatment apparatus according to claim 10 including a second tank, and means for substituting said second tank in place of the first named tank in said system, said first tank being flushed by said flushing means while said second tank is in said system and being subsequently placed back in said system while said second tank is flushed.

12. Fluid treatment apparatus comprising, a reverse osmosis membrane vessel having a product outlet, first and second fluid tanks, a circulating pump, means for connecting one or the other of said tanks in a closed loop with said reverse osmosis membrane vessel and said pump, a feed pump adapted to be connected to a source of fluid to be treated and having an outlet, means connecting said feed pump outlet to the tank not in said loop, said circulating pump being operative to continuously circulate untreated fluid through said closed loop.

a high pressure pump having its outlet connected to said closed loop to maintain sufficient pressure in said loop to sustain reverse osmosis so product continuously exits said product outlet, said product comprising treated fluid from which impurities have been removed, means limiting the delivery from said high pressure pump to said loop to the amount of fluid required to make up for the product withdrawn from said product outlet, means connecting the tank not in said loop to a drain, and means for periodically interchanging the tank in said loop and the tank connected to said feed pump.

13. A fluid treatment system comprising, a closed loop batch treatment system including a first tank, a circulating pump and a reverse osmosis membrane vessel, a pump operative to continuously deliver fluid to be treated from the source to said system at a pressure high enough to sustain reverse osmosis and at a rate equal to the rate of product withdrawal, said product comprising treated fluid from which impurities have been removed, said circulating pump being operative to continuously circulate fluid through said closed loop system, a second tank outside said system, means for substituting the tank outside the system for the tank in the system and for removing from the system the tank for which the substitution was made, and means for flushing the tank not in the system with untreated fluid.

14. Fluid treatment apparatus comprising, first and second tanks, a reverse osmosis membrane vessel, a circulating pump, means for connecting either of the tanks in a high pressure closed circulating loop including said reverse osmosis membrane vessel and said pump, a high pressure pump continuously delivering fluid to said circulating loop at a pressure sufficient to cause reverse osmosis so product continuously exits said vessel, said product comprising treated fluid from which impurities have been removed, a feed pump adapted to be connected to an untreated fluid source, means connecting the tank not in said loop with the output of said feed pump and with a waste drain, and means for interchanging the tanks.

* * * * *